US012671666B2

(12) United States Patent
Stoneman et al.

(10) Patent No.: US 12,671,666 B2
(45) Date of Patent: Jun. 30, 2026

(54) METHOD AND SYSTEM FOR SELECTING AND ATTACHING AN AUDIO CLIP TO A TEXT MESSAGE

(71) Applicant: ClickTune LLC, Fairview, TX (US)

(72) Inventors: Tom Stoneman, Milipitas, CA (US); Stephen Arnold, Fairview, TX (US)

(73) Assignee: ClickTune LLC, Fairview, TX (US)

( * ) Notice: Subject to any disclaimer, the term of this patent is extended or adjusted under 35 U.S.C. 154(b) by 0 days.

(21) Appl. No.: 19/224,009

(22) Filed: May 30, 2025

(65) Prior Publication Data

US 2026/0075016 A1 Mar. 12, 2026

Related U.S. Application Data

(60) Provisional application No. 63/691,436, filed on Sep. 6, 2024.

(51) Int. Cl.
| | |
|---|---|
| *G06F 3/048* | (2013.01) |
| *G06F 3/0482* | (2013.01) |
| *G06F 40/134* | (2020.01) |
| *H04L 51/10* | (2022.01) |

(52) U.S. Cl.
CPC ............ *H04L 51/10* (2013.01); *G06F 3/0482* (2013.01); *G06F 40/134* (2020.01)

(58) Field of Classification Search
None
See application file for complete search history.

(56) References Cited

U.S. PATENT DOCUMENTS

| | | | | |
|---|---|---|---|---|
| 9,639,861 | B2 * | 5/2017 | DeMattei | ........... G06Q 30/0267 |
| 9,986,394 | B1 * | 5/2018 | Taylor | .................... H04W 4/18 |
| 10,698,951 | B2 * | 6/2020 | Cameron | ............. G06V 30/268 |
| 2004/0179037 | A1 * | 9/2004 | Blattner | ................ H04L 51/046 |
| | | | | 715/751 |
| 2018/0352394 | A1 * | 12/2018 | Li | ........................... G06F 9/541 |
| 2025/0217638 | A1 * | 7/2025 | Lin | ........................... G06N 3/08 |
| 2025/0245872 | A1 * | 7/2025 | Cokely | .................. G06F 16/58 |

* cited by examiner

*Primary Examiner* — Thanh T Vu
(74) *Attorney, Agent, or Firm* — Foley & Lardner LLP

(57) ABSTRACT

The disclosure provides a system and method for attaching audio clips to text messages to allow the conveyance of emotion through sound. The audio clips can include vocals, instruments, and/or a combination of both. The audio clips can be manually or automatically selected for sending via a text message. In one example, a method of sending text messages disclosed herein includes: (1) selecting an audio clip that corresponds to text of a text message from a user, (2) connecting the audio clip with the text message, and (3) delivering the text message to a recipient.

19 Claims, 5 Drawing Sheets

METHOD AND SYSTEM FOR SELECTING AND ATTACHING AN AUDIO CLIP TO A TEXT MESSAGE

CROSS-REFERENCE TO RELATED APPLICATION

This application claims the benefit of U.S. Provisional Application Ser. No. 63/691,436, filed by Tom Stoneman, et al., on Sep. 6, 2024, which is commonly assigned with this application and incorporated herein by reference in its entirety.

TECHNICAL FIELD

The disclosure relates to the field of communication and, more specifically, to conveying emotion through a text message using an audio clip that corresponds to the content of the text message.

BACKGROUND

Research has shown that auditory stimuli, including music and sound create emotional connections far more effectively and rapidly than written or visual stimuli. Auditory stimuli taps into the brain's most powerful memory sense, which is sound, and engages regions of the human brain (amygdala section of the limbic system) that graphics and visual stimuli are simply unable to access. The human brain requires only 146 milliseconds to respond to sound, a reaction time that is quicker than that for touch (149 milliseconds), sight (189 milliseconds), and taste (500 milliseconds). As such, being able to use audio to convey such a powerful emotional connection during communication, such as via texting, would be beneficial.

SUMMARY

In one aspect, the disclosure provides a method of sending text messages. In one example the method includes: (1) selecting an audio clip that corresponds to text of a text message from a user, (2) connecting the audio clip with the text message, and (3) delivering the text message to a recipient.

In another aspect, a computing system is disclosed. In one example the computing system includes: (1) an interface configured to receive a text message and (2) one or more processors configured to perform operations that include selecting an audio clip that corresponds to text of the text message and connecting the audio clip with the text message.

In yet another aspect, the disclosure provides a non-transitory computer-readable medium having a series of operating instructions stored thereon that direct one or more processors to perform operations when executed. In one example the operations include: (1) selecting an audio clip that corresponds to text of a text message from a user, (2) connecting the audio clip with the text message, and (3) delivering the text message to a recipient.

BRIEF DESCRIPTION

Reference is now made to the following descriptions taken in conjunction with the accompanying drawings, in which.

DETAILED DESCRIPTION

Figure 1:
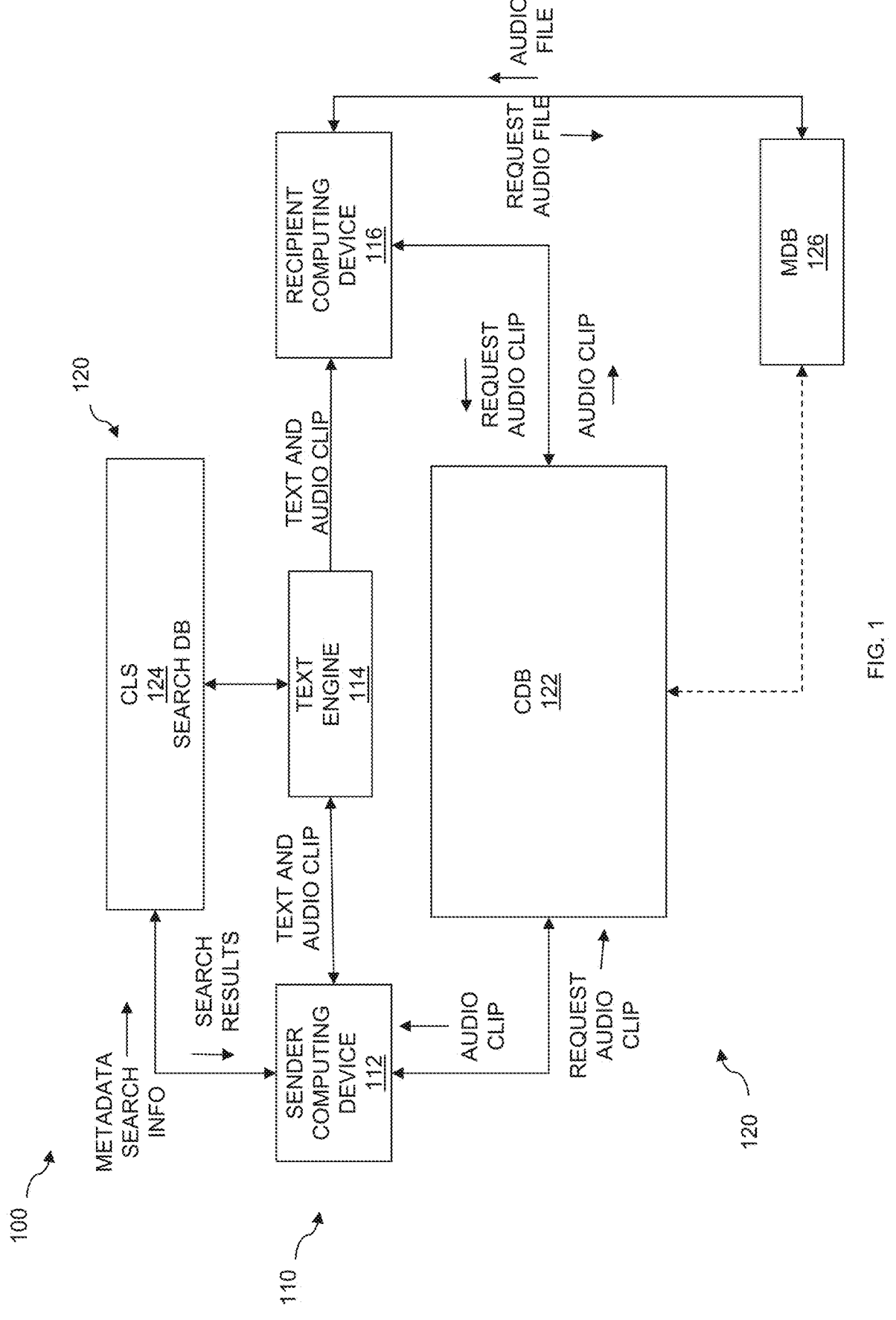
FIG. 1 illustrates a block diagram of an example of a communications infrastructure for selecting and providing an audio clip with a text message according to the principles of the disclosure.

Text messages are a common way people communicate between each other. While there are many ways to enhance text messages, such as using emojis and Graphic Interchange Format (GIF) files, there is currently no seamless method for adding short audio clips to text messages. As such, senders of text messages are limited in creating an emotional connection with recipients using audio. Accordingly, an enhanced communication experience for users would be beneficial.

The disclosure provides a system and method for attaching audio clips to text messages, such as short messaging service (SMS) messages and instant messages (IM), to allow the conveyance of emotion through sound. In addition to SMS messages and IM, the text messages can include other types or forms of texting, such as Multimedia Message Service (MMS) messages, iMessages, Rich Communication Services (RCS) messages, and Push Notifications.

The audio clips can include vocals, instruments, and/or a combination of both. Via the disclosed processes, an appropriate portion of an audio file (i.e., an audio clip) is selected that relates to the text message and provided to a recipient with the text message. The audio file can be a song and the audio clip can be the most recognizable portion of the song that relates to the text message. A selected audio clip can be sent to one or more recipients. An audio clip can be from a video and in some examples the corresponding video portion can be sent with the audio clip.

An audio clip as used herein, therefore, is a short, self-contained segment of an audio file, such as a song. A length of the audio clip can vary depending on the selection. Alternatively, a standard amount of time can be used for the audio clips regardless of the selection. For example, five second audio clips could be used for all selections. The play length of the audio clips can be based on the messaging application or service that is used. Example ranges of the play length of an audio clip is two to five seconds, three seconds or less, four seconds or less, and less than ten seconds. The audio clips can be sized for communicating via a texting protocol, such as via a Multimedia Messaging Service (MMS) protocol. For example, the audio clips can be a MP3 file of 525 kB or less.

In one example the disclosed method includes selecting at least one audio clip related to the text in a text message and inserting the selected audio clip with the text message to create an effective way to convey emotion or meaning along with the text message. Based on one or more factors, such as the message's context, the familiarity of the audio clip, and the related emotional impact, a sender of a text message, or simply a sender, can choose a sound to craft an improved text message. The disclosed method and system can operate seamlessly, allowing senders to quickly select the most recognizable part of their favorite popular song in seconds, whether a vocal or instrumental section, and quickly send the text message with the audio clip. Upon receipt of the text message, the audio clip can be automatically played when the text message is activated. The recipient can activate the text message by clicking on the text message via a touch screen or other user interface, such as a keyboard or mouse. The text message can also be activated when the text message is displayed (e.g., opened by the recipient), such as by opening the text messaging application. In other examples, the audio clip can be played by clicking a link that is sent as part of the text message. The link can be represented by a symbol, such as album art associated with the song of the audio clip. Additionally, the text message can include a link wherein the recipient can have the option to click to a landing page to view special contextual offers from advertisers or to listen to the full song of the audio clip on their favorite streaming application.

The text message can be sent without text. In other words, a sender may search for a particular audio clip that expresses an emotion they would like to convey and send the audio clip to the recipient using a text message without text. For example, senders could simply select an audio clip for play on the recipient's device. A sender could also enter a particular word or words as a text message wherein an audio clip is selected based thereon and then the sender can delete the word or words and then send the text message. For example, a sender can type "annoyed" as text, an audio clip associated with "annoyed" is selected to send to a recipient, and the sender deletes "annoyed" before sending the text message.

Some beneficial features disclosed herein include the ease upon which audio clips can be selected and the seamless integration of a selected audio clip with a text message. For example, senders can choose from a library of audio clips that are contextually relevant to a text message and select an audio clip based on their recognizability and emotional resonance. The selected audio clip (e.g., a guitar solo or a popular segment of a favorite song) can then be connected with the text message for sending to one or more recipients. Connected with or connecting the audio file to the text message as used herein provides access of the audio clip to a recipient(s) via the text message. For example, the audio clip can be embedded with the text message for sending according to a texting protocol being used. In another example, a link to the audio clip can be provided with the text message. Upon receiving the text message, the recipients can hear the connected audio clip as they read the text.

The disclosed system, referred to as an audio clip management system (ACMS), and method can be compatible with various messaging platforms and support fast retrieval and insertion of audio clips to create a fluid and enjoyable user experience. The ACMS and method include security and privacy controls to protect user data and ensure the integrity of the audio clips. A user is someone, such as a sender and/or a recipient, which is registered with the ACMS.

Turning now to the FIGS, FIG. 1 illustrates a block diagram of an example of a communications infrastructure 100 for selecting and providing an audio clip with a text message according to the principles of the disclosure. The communications infrastructure 100 includes a texting network 110 having components configured for sending and receiving text messages and an ACMS 120 configured to allow a sender to add one or more audio clips to the text messages. The texting network 110 includes a sender computing device 112, a text engine 114, and a recipient computing device 116. The ACMS 120 includes a clip database (CDB) 122, a clip lookup service (CLS) 124, and a music database (MDB) 126. Various APIs can be used to communicate between the sender and recipient computing devices 112, 114, and the ACMS 120.

The sender computing device 112 and the recipient computing device 114 are configured to communicate over one or more communications networks that includes communicating via texting. The sender and recipient communication devices 112, 114, include a screen and a speaker that enables viewing texts and listening to audio clips. The sender and recipient communication devices 112, 114, can be stationary computing devices, such as a desktop computer, or mobile computing devices, such as, smart phones, computing pads, tablets, or laptops.

The text engine 114 is a message platform of a message service that enables sending texts between the sender and recipient computing devices 112, 114. The text engine 114 can be, for example, for texting via cellular systems, the internet, or both. Selected audio clips, such as those stored on the CDB 122, are provided to the sender computing device 112 for delivery to the recipient computing device 116 via a text message using the text engine 114.

The CDB 122 is one or more memory or data storage configured to store audio clips that have already been prepared and identified, such as via metadata and/or a clip ID. The metadata can correspond to lyrics, emotion, artist, etc. The CDB 122 can be located on a server or another computing device. One or more of the different databases of the ACMS 120 can be integrated on a single computing device. For example, the CDB 122 and the MDB 126 can be on a single computing device.

The CLS 124 is configured to locate an audio clip for the sender. As such, the CLS 124 can include search filters that use search data from a sender's request to identify one or more audio clips or songs that the sender uses to select/request an audio clip from the CDB 122. The audio clip can be provided to the sender computing device 112 allowing the sender to send the text message and audio clip to the recipient computing device 116 using the text engine 114. The audio clip is automatically played when the text message is activated.

The CLS 124 can search for audio clips via machine learning (ML) algorithms using a trained model. Instead of stored audio clips on the CDB 122, the CLS 124 can automatically perform a search on a database, such as the MDB 126, and audio clips generated from songs on the database can be provided as the search results or part of the search results. Thus, a combination of already stored audio clips and audio clips generated after the sender's request can be provided in response to a search.

The automatically generated audio clips can be generated in real time. The dashed line in FIG. 1 represents generating audio clips using ML or another computing process, which can occur in real time and can be after the search data and/or audio clip request are generated.

As such, an artificial intelligence (AI) system, such as an ML system, can be used for selecting audio clips and generating audio clips. An AI system, for example, can be used to automatically detect a tone of a text message and select an audio clip based on the detected tone. For example, a tone of happy, sad, mad, annoyed, etc., can be automatically detected and one or more audio clips automatically selected for the sender. Biometric data of the sender may be used to automatically select audio clips. For example, a sender's heartrate can be measured from a device and the heartrate can be associated with an emotion for selecting of audio clips. Thus, the search data used to select one or more audio clips for a sender can include metadata, can be from the text of a text message, can be biometric data, a tone of a text message, or a combination of one or more of these. One or more (including all) of generating, selecting, and connecting audio clips can be performed automatically by a computing system, such as an AI system.

Creation of the audio clips and associated metadata can be manually generated or automatically generated using a computing process. For example, audio clips and associated metadata can be automatically created from songs using ML. A ML model can be trained to identify audio clips from songs that convey or are associated with certain emotions and/or text.

The MDB 126 is one or more memories or data storage configured to store audio files. In some example, the recipient may desire the song of the audio clip and can request an audio file of the song from the MDB 126. An API can be used by recipient to access the MDB 126. Additional information and promotions can also be obtained from the MDB 126 or other databases or systems. For example, links may be provided with the text messages that lead to the databases, such as the MDB 126. The MDB 126 can be a private, public, or combination thereof database of audio files.

Figure 2:
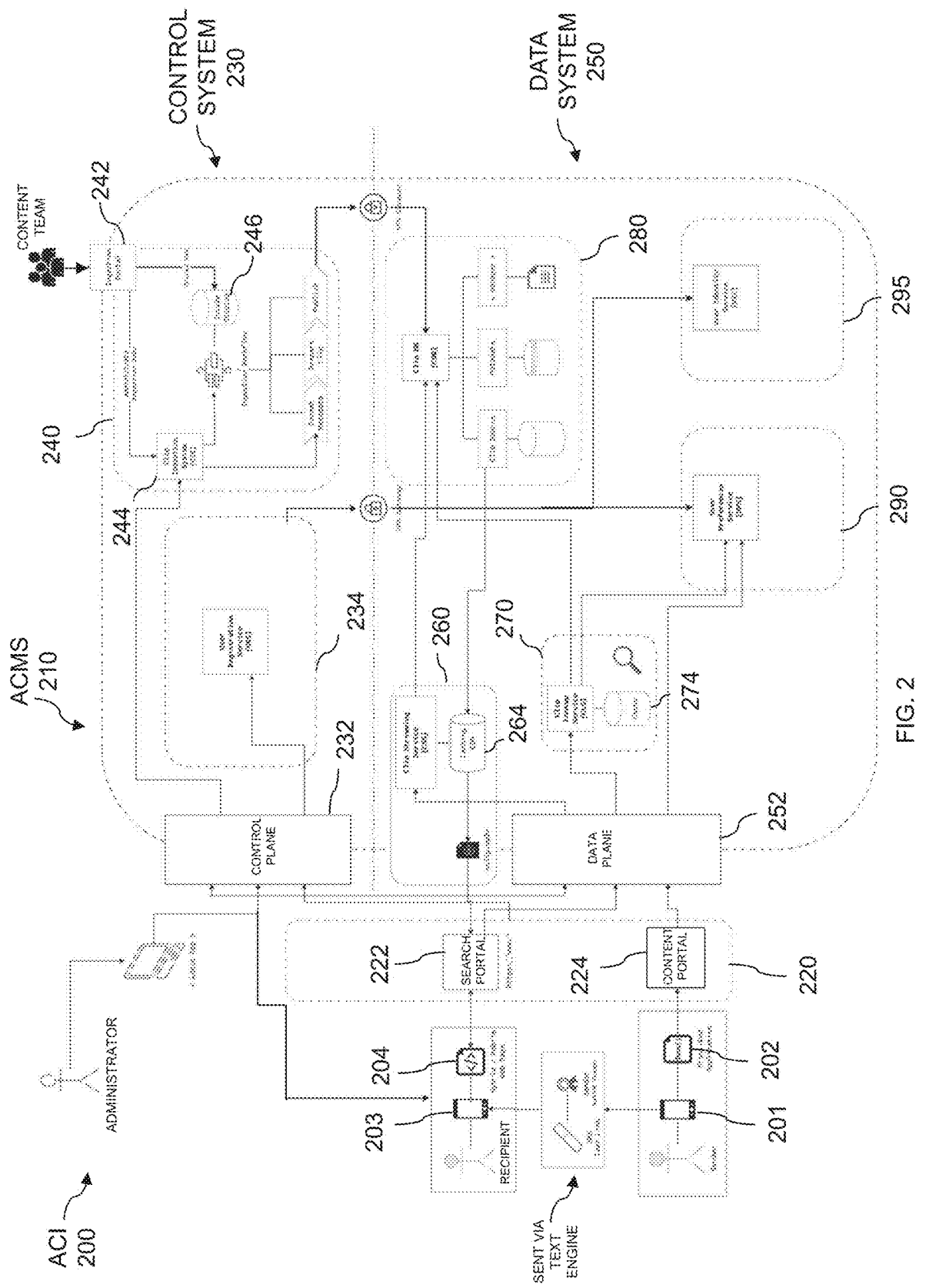
FIG. 2 illustrates a diagram of example of an audio clip infrastructure (ACI) for selecting and providing an audio clip with a text message according to the principles of the disclosure.

FIG. 2 illustrates a diagram of example of an audio clip infrastructure (ACI) 200 for selecting and providing an audio clip with a text message according to the principles of the disclosure. The ACI 200 is configured to allow a sender to select an audio clip and send a text message with the audio clip to a recipient wherein the audio clip will play when the received text message is activated. The ACI 200 includes a sender computing device 201, a recipient computing device 203 and an audio clip management system (ACMS) 210. The ACMS 210 includes an interface 220, a control system 230, and a data system 250. The control system 230 includes a control plane 232, a user registration service (URS) 234, and a clip ingestion system (CIS) 240. The data system 250 includes a data plane 252, a clip streaming service (CSS) 260, a clip look-up service (CLS) 270, a clip database (CDB) 280, a user preference service (UPS) 290, and a user identity service (UIS) 295. The components of the control system 230 and the data system 250 can be established as microservices.

The sender and recipient computing devices 201, 203, are stationary or mobile computing devices such as the sender and recipient computing devices 112 and 116 of FIG. 1. As such, a sender can use the sender computing device 201 to send a text message and one or more audio clip to the recipient computing device 203 of a recipient via a text engine as indicated in FIG. 2, such as via text engine 114.

The interface 220 is configured to provide access for the sender and the recipient to the control system 230 and the data system 250 of the ACMS 210. The interface 220 can be a webpage of the ACMS 210. The interface 220 includes a search portal 222 and a content portal 224. The search portal 222 is configured to allow the sender to access the CLS 270 via the data plane 252. The sender can enter search data via a front-end application 202 operating on the sender computing device 201 that provides the search data to the search portal 222 for processing.

The content portal 224 is configured to allow the recipient access to view content of the ACMS 210. The recipient can access the content portal 224 via a web page 204 on the recipient computing device 203. Through the content portal 224 the recipient can view, for example, the various available audio clips stored on the CDB 280. The recipient can also register with the ACMS 210 via the URS 234 to enable sending audio clips, also.

The control plane 232 provides access to the various services of the control system 230. The control plane 232 can be an API that provides an interface for access. The API can be, for example, a Representational State Transfer (REST) API.

The URS 234 is configured to facilitate signing-up or registering with the ACMS 210. Upon registering, registrants, such as the sender and the recipient, can also establish preferences for audio clips and other content. The URS 234 can provide a form-submission from a web-facing registration site to facilitate the registering. The registration site can be that of the messaging service that the sender uses to send text messages. In other words, instead of a designated URS 234 for the ACMS 210, a registration site used for a messaging service can be used to register users for sending audio clips. Once a registrant is signed-up, the URS 234 can provide preference information and identity information to the UPS 290 and the UIS 295 of the data system 250.

The CIS 240 is configured for registering, tagging, formatting, and uploading audio clips to the CDB 280. To ingest a new audio clip, the source audio and assets will first be uploaded to a staging repository (e.g., an Amazon Web Services (AWS) S3 bucket) and a job will be started in a workflow orchestrator (e.g., AWS StepFunction). The job will be provided the initial metadata of the audio clip and mapped to a unique Clip Id for storage in the CDB 280. The assets include one or more features associated with the source audio, such as album art, artist profile, song history, lyrics, etc.

The CIS 240 includes an ingestion portal 242 that receives audio clips. The audio clips and associated assets can be uploaded manually by a content team that sources the clips. The upload and job invocation can be performed via automated scripts. A webtool may also be used to provide a front-end for uploading the audio clips, the assets, and job monitoring. ML can also be used to automatically create the audio clips and associated metadata from songs. As noted above, a ML model can be trained to identify audio clips from songs that convey or are associated with certain emotions and/or text. An automated system to source, tag, and stage clips for ingestion can also be used. The automated system can enhance bulk uploads of the audio clips.

In addition to the ingestion portal 242 the CIS 240 includes an ingestion director 244 and an intake repository 246. The inflow process for ingesting the audio clips includes uploading the audio clips through the ingestion portal 242 and storing the uploaded audio clips in the intake repository 246. Assets associated with the audio clips, such as album art, can also be uploaded and stored manually and/or automatically. A metadata document is prepared with initial track data and search tags for the audio clips. The metadata document is also stored on the intake repository 246. Via the ingestion director 244 a job is created and linked to the audio clips and associated metadata documents. The ingestion director 244 also directs the ingestion process by formatting the metadata, preparing the audio clips, and publishing the audio clips for storage in the CDB 280. For example, the ingestion director 244 can validate the audio clips and metadata documents for import, assign Clip IDs to the audio clips, and create a stub entry for the audio clips in the CDB 280. The audio clips can also be formatted to a desired format, such as .mp3, and can be downmixed/FX applied accordingly. The assets can be similarly formatted, such as creating thumbnails/detail images for the album art, accordingly. The audio clips and the assets can be stored in the staging repository 246. The audio clips and metadata are then uploaded to the CDB 280. The metadata is also primed in a CLS cache 274 of the CLS 270. The ingestion director 244 then verifies a successful lookup and asset retrieval via CLS/CSS APIs.

The data plane 252 provides access to the various services of the data system 250. The services include, for example, managing, storing, and vending the audio clips to senders. The audio clips can be vended via File Transfer Protocol (FTP) links. The data plane 252 can be an API that provides an interface for access. As with the control plane 232, the API can be REST API.

An administrator of the ACMS 210 can communicate with the control system 230 and the data system 250 via the control plane 232 and the data plane 252. An administrator app executing on a computing device can be used to allow access. The administrator can also communicate with the recipient using, for example, the administrator app, to provide assistance.

The CSS 260 is configured to dispatch content streams for the requested audio clips via, for example, a Uniform Resource Identifier (URI). The content streams of the audio clips are provided to the recipient computing device 203 via the search portal 222 upon activation of the received text message. The audio clips can be provided to the recipient computing device 203 via the hybrid/mobile webpage 204 accessible thereon. The recipient can also use the hybrid/mobile webpage 204 to access the ACMS 210 for registering. As noted above, the audio clips and supporting assets are stored on the CDB 280, which can be a S3 bucket. The CSS 260 includes a cache 264 that stores the audio clips before dispatching. The audio clips stored thereon can be the ones provided to the sender in response to the search data; including the audio clip selected for sending.

The CLS 270 is configured to provide a paginated list of audio clips to match a sender's search data. While the audio clips are stored on the CDB 280, the CLS 270 is responsible for indexing them by search tags and caching redundant requests using cache 274. As such, the CLS 270 can generate a list of audio clips having search tags that match a sender's search data. The generated list can also be based on a search history of the sender.

The CDB 280 is configured to store the audio clips and assets, such as audio file sources of the audio clips. The CDB 280 can be a network of datastores and can include a manager configured to direct operation of the CDB 280. In addition to being stored, the audio clips are also indexed in accordance with the CLS 270. The audio clips can be registered with a unique Clip ID and stored in a remote filesystem where they can be served via FTP through a public URL. The metadata of the audio clips can be stored in a dynamic NoSQL table for association with search tags and other attributes used to determine which audio clips are relevant to a sender's search data.

The UPS 290 is configured to store and retrieve a sender's music preferences. Additional preferences can also be stored, such as advertising preferences. The UPS 290 can be a relational DB to allow for fast access during Search UX. The UPS 290 can map an identifier of a sender, a User ID, to a defined list of music genre, artist, and 'emotion' tags.

The UIS 295 is configured to store and validate user-provided credentials and provides an authentication to represent the user's session with the ACMS 210. An authentication token can be provided to the sender after validation. The UIS 295 can provide encrypted storage of usernames, emails, and passwords for user protection and a threat protection system (TPS) during user access.

Figure 3:
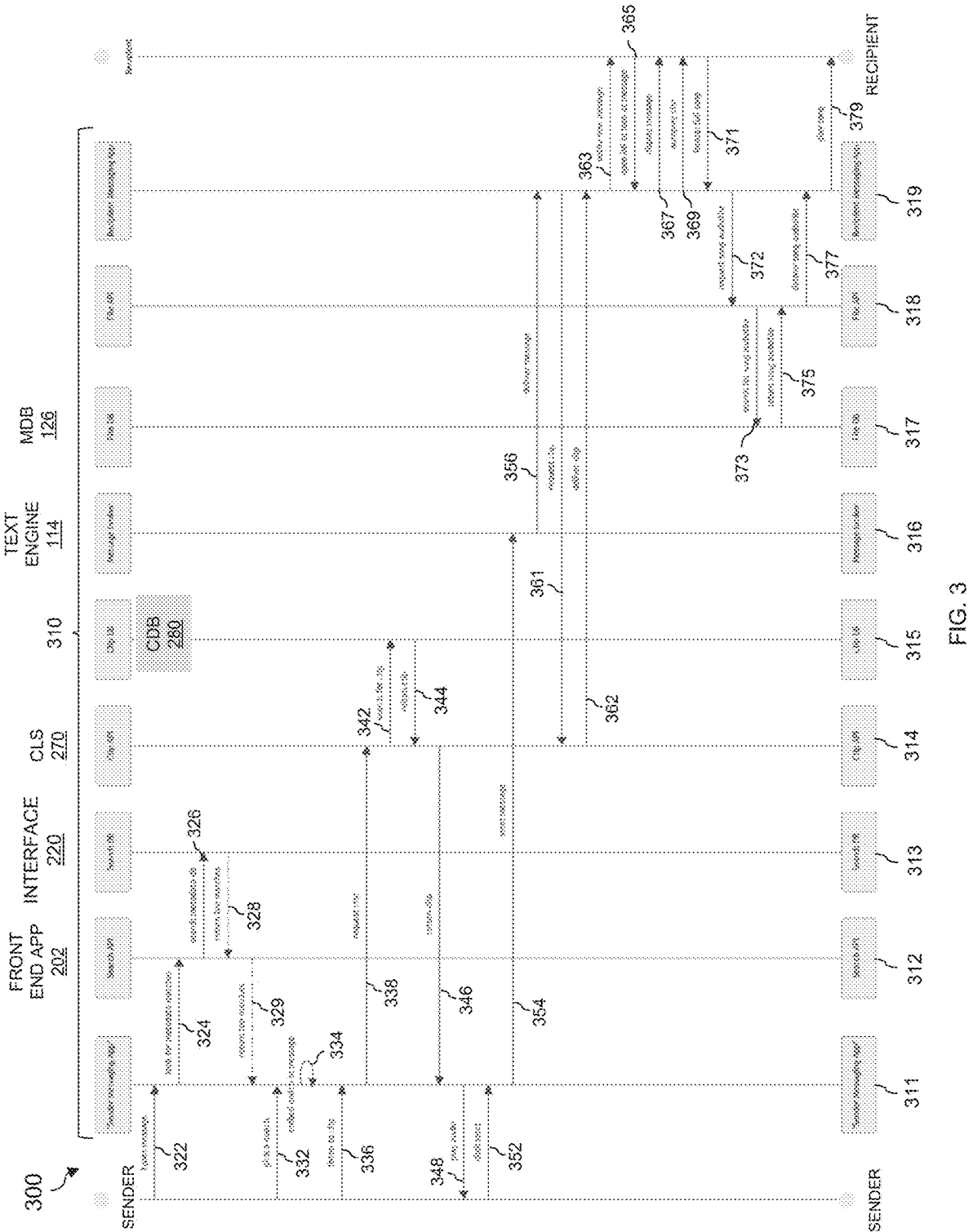
FIG. 3 is a diagram showing an example of an embedded message workflow for delivering a text message with an audio clip according to the principles of the disclosure.

FIG. 3 is a diagram showing an example of an embedded message workflow 300 for delivering a text message with an audio clip according to the principles of the disclosure. The workflow 300 demonstrates the messaging between different applications/databases/devices, generally referred to herein as actors, for selecting and playing an audio clip with a text message. The various applications can be stored on the one or more processors of the computing devices of the sender or recipient. The various databases (DB) and/or application program interfaces (API) can be stored on the one or more memories of the computing devices of the sender or recipient or on another computing device, such as one or more servers. In addition to playing the audio clip, the workflow 300 also illustrates an option for the recipient to request the song (or at least a longer portion of the audio clip) that includes the audio file for their listening. One or more components of the communications infrastructure 100 and of the ACI 200 of FIGS. 1 and 2 corresponds to one or more actors or services of the message workflow of FIG. 3. The workflow 300 begins after a sender has already registered with the ACMS.

In step 322 the sender enters text for a message. The text is entered and received via a messaging app operating on the computing device of the sender. A user interface of the computing device is used by the sender to enter the text. The text can be entered, for example, by typing or by speaking that is then converted to text. The front-end application 202 of the ACMS operating on the sender's computing device also receives the text in step 324 and initiates looking for audio clip options using search data. The search data is provided to the interface 220 in step 326. Based at least on the search data, the interface 220 returns one or more top matches of audio clips in step 328 to the front-end application 202 according to the search data and then to the sender in step 329 via the messaging app on the sender's computing device. The top matches are provided to the sender such that the sender can select a desired audio clip in step 332. A list of the top matches and the audio clips themselves can be provided for the sender. After the audio clip is selected, the audio clip is connected to the text message in step 334. As noted in FIG. 3, the audio clip is connected in this example by being embedded in the text. The sender listens to the audio clip in step 336 and requests the audio clip in step 338 for sending. Steps 332 and 336 can be repeated multiple times for the sender to select the audio clip for sending. For example, multiple audio clips can be provided (such as in Step 3 of FIG. 5) and a sender can listen to one or more of the audio clips before selecting one to send. Additionally, while step 334 occurs before sending of the message (for example step 352 or 354), step 334 can occur after selection of the audio clip to send, such as after step 338. The sender can send one text message with a connected audio clip at a time. The sender may send the text message to multiple recipients according to the texting service being used.

The CLS 270 receives the audio clip request in step 338 and searches for the audio clip in the CDB 280. The CDB 280 sends the selected audio clip to the CLS 270 in step 344 and in step 346 the audio clip is provided to the sender via the messaging app that allows the sender to listen to the audio clip in step 348. The sender then executes sending the text message with the audio clip in step 352 via the messaging app. The text message and the audio clip are then sent to the text engine 114 in step 354 and delivered to the messaging app on the recipient's computing device in step 356. Upon receipt, the messaging app requests the audio clip in step 361 and the audio clip is delivered to the messaging app in step 362. In step 363, the messaging app notifies the recipient of a new message upon which the recipient opens the messaging app in step 365 to view the message. In step 367 the message is displayed and the audio clip is automatically played in step 369.

Steps 371 to 379 provide an example when the recipient is interested in hearing the song upon which the audio clip was obtained. In step 371, the recipient looks up the full song and requests the audio file of the song in step 372. A search for the audio file on a music database, such as MDB 126, is performed in step 373 and the audio file of the song is returned in step 375. The audio file of the song is then delivered to messaging app on the computing device of the recipient in step 377. In step 379 the recipient plays the audio file. The text message can also include a link wherein the recipient can have the option to click to a landing page to listen to the full song of the audio clip. Additionally, the link can provide special contextual offers from advertisers for the recipient.

Figure 4:
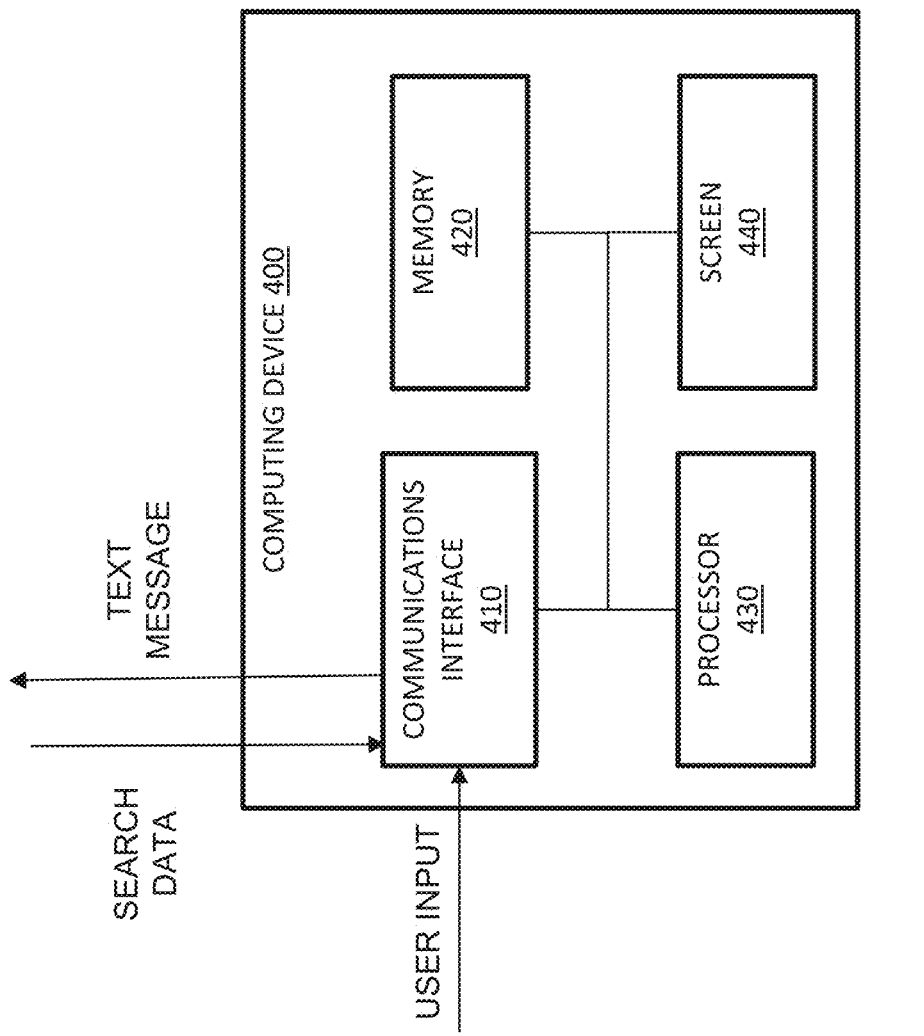
FIG. 4 illustrates a block diagram of an example of a computing device configured to perform operations according to the principles of the disclosure.

FIG. 4 illustrates a block diagram of an example of a computing device 400 configured to perform operations according to the principles of the disclosure. The computing device 400 can be a computing device of the computing systems in FIGS. 1-3. The various components of the computing device 400 can communicate via conventional connections. In some aspects, computing device 400 can be part of another system (e.g., processor, core, server, or other systems), and can be integrated with one device, such as a part of a processing system. Computing device 400 represents a demonstration of the functionality employed for the disclosure, and implementations can use a variety of devices, for example, circuits of a processor, dedicated processors, virtual systems, servers, other computing or processing systems, be in software or hardware, or various combinations thereof.

Computing device 400 can be configured to perform the various functions disclosed herein including selecting and sending an audio file by a sender. The computing device can also represent a recipient's device for receiving a text message or a server, such as a server having a database that includes audio clips. Computing device 400 includes one or more communications interface represented by communications interface 410, one or more memories or data storage represented by memory 420, one or more processors represented by processor 430, and a screen 440.

Communications interface 410 is configured to transmit and receive data. For example, communications interface 410 can receive user inputs, such as text for a text message (written or spoken). Communications interface 410 can also transmit data, also, such as search data (e.g., metadata) for audio clips and text messages.

Memory 420 can be configured to store a series of operating instructions that direct the operation of the processor 430 when initiated, including supporting code representing one or more algorithms for selecting audio clips and/or generating audio clips. The memory 420 includes a non-transitory computer-readable medium. The memory 420 can include multiple types of memory and the memory can be distributed.

Processor 430 performs operations according to one or more algorithms directed to perform the operations disclosed herein. Processor 430 can be configured to, for example, select audio clips, create audio clips, play audio clips, and other functions as disclosed herein. The algorithms can be associated with AI, such as ML algorithms. The processor 430 can be a CPU, a GPU, a single instruction multiple data (SIMD) processor, or other processor types.

Screen 440 is configured to display information and can be a typical screen of a computing device. The information can be associated with selecting an audio file according to the principles of the disclosure. Screen 440 can also display text messages; including text messages with audio clips. Computing device 400 can be a sender's computing device, such as a smartphone. As such, screen 440 can be a screen of a smartphone, which includes a touchscreen. Besides a touchscreen, another user interface, such as a keyboard, keypad, mousepad, or microphone, can be used to interface with the screen 440. Screen 440 can display an application for selecting an audio clip to send, such as represented by FIG. 5.

Figure 5:
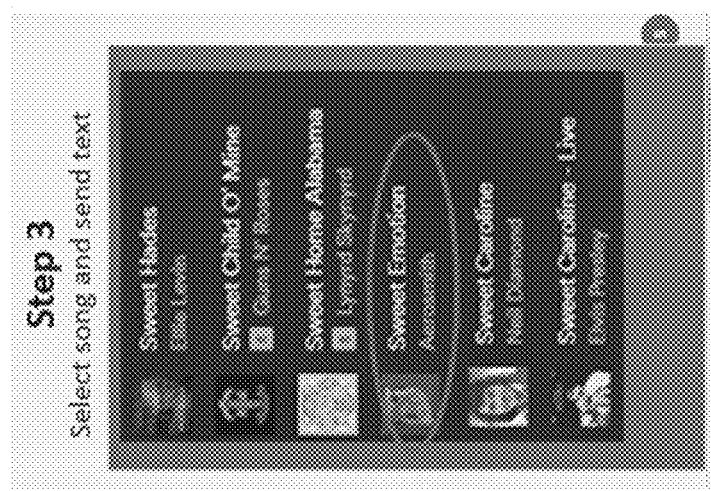
FIG. 5 is a mockup of an example of an application on a smartphone showing a user interface on a screen representing the embedded message workflow for adding audio clips to text messages according to the principles of the disclosure.
Figure 5:
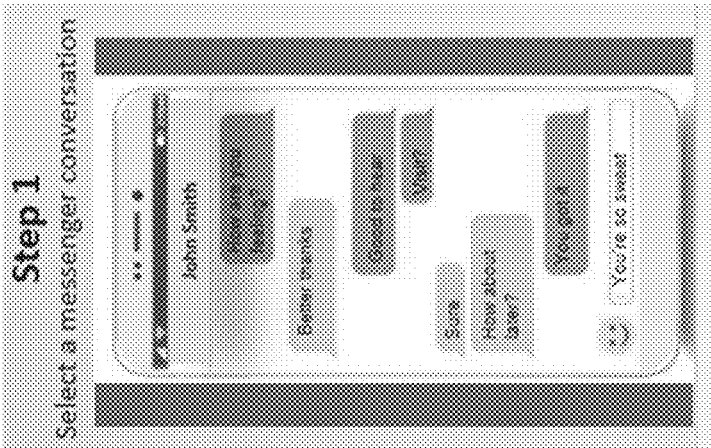

FIG. 5 is a mockup of an example of an application on a smartphone showing a user interface on a screen, such as screen 440, representing the embedded message workflow for adding audio clips to text messages according to the principles of the disclosure. The smartphone represents a sender's computing device. Three steps are illustrated as part of a visual user interface on a smartphone screen to allow a sender to select an audio clip. In step 1, a text message conversation on the screen of the smartphone is shown. The last text of the conversation to be sent is "You're so sweet". A messaging app of the sender can be used for the text message conversation (represented by "Sender Messaging App" in FIG. 3). In step 2, an option is provided to select adding an audio clip to the last text. The selection page of Step 2 with the option to select an audio clip can be obtained by, for example, touching the screen of the smartphone at or adjacent to the text for a designated amount of time. Once the option screen is displayed, the music notes can be selected (again via touch, for example) and a search window is provided allowing the sender to enter search data, such as a keyword or phrase corresponding to the text, using a keyboard (for example a virtual keyboard). In response to the search, a drop down list is provided allowing the sender to select an option that results in the list of songs provided in Step 3. The sender can then select the desired song, which is "Sweet Emotion" by Aerosmith in this example. The front-end app 202 and the CLS 270 as represented in FIG. 2 can be used for providing the options for selecting as represented in Steps 2 and 3. The last text can then be sent with an embedded audio clip from the song. Alternatively, a link or request for the audio clip can be sent with the text. The audio clip can be stored on the CDB 280 and automatically retrieved and sent to the recipient for automatic play of the audio clip when the text message is activated (e.g., when the text message is displayed for the recipient). The text message with access to the audio clip can be sent via the text engine 114, which is used to represent message service and/or message platform.

As noted above, selection and entering of text can be performed according to the typical operations of the smartphone, such as via touch when the screen is a touchscreen and via a virtual keyboard. Instead of or in addition to a visual interface, an audible interface can also be used via a speaker and microphone of the smartphone. One or more processors on the smartphone can generate the interface and perform the processes represented in FIG. 5 according to a series of operating instructions that correspond to one or more algorithms for selecting and adding an audio clip to a text message as disclosed herein. The one or more algorithms can be stored on one or more memories or data storage on the smartphone or on another computing device, such as a server, that the smartphone is connected to via a communication network. Memory 420 of FIG. 4 provides an example.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

The digital data processors or computers can be comprised of one or more GPUs, one or more CPUs, one or more of other processor types, or a combination thereof. The digital data processors and computers can be located proximate each other, proximate an intelligent machine, in a cloud environment, a data center, or located in a combination thereof.

Neural networks (NN) can be used herein that include multiple layers of connected nodes that can be trained with input data to solve complex problems. For example, desired emotions to convey, tone of text, keywords such as from a text, can be used as input data for training of the NN. Once the NNs are trained, the NNs can be deployed and used to generate audio clips and/or select audio clips.

In one example of training, data flows through the NNs in a forward propagation phase until a prediction is produced that indicates a label corresponding to the input. When the NNs do not correctly label the input, errors between the correct label and the predicted label are analyzed, and the weights are adjusted for features of the layers during a backward propagation phase that correctly labels the inputs in a training dataset. With thousands of processing cores that are optimized for matrix math operations, GPUs are an example of processors capable of delivering the performance required for training NNs for AI and ML applications.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Configured or configured to means, for example, designed, constructed, or programmed, with the necessary logic, components, and/or features for performing a task or tasks.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each one of the aspects identified in the Summary can include features of one or more of the below dependent claims in combination.

What is claimed is:

1. A method of sending text messages, comprising:
training a machine learning (ML) model to identify audio clips that convey corresponding emotions;
detecting, by the ML model, an emotion conveyed by text of a text message from a user;
automatically selecting, by the ML model, an audio clip that corresponds to the emotion conveyed by the text of the text message from the user, wherein automatically selecting the audio clip comprises:
identifying, by the ML model, a portion of an audio file that corresponds to the emotion conveyed by the text of the text message from the user; and
automatically generating, by the ML model, the audio clip from the audio file in real-time after detecting the emotion conveyed by the text of the text message from the user such that the audio clip contains the identified portion of the audio file that corresponds to the emotion conveyed by the text of the text message from the user, wherein the audio file has a longer duration than the audio clip;
connecting the audio clip with the text message; and
delivering the text message to a recipient.

2. The method as recited in claim 1, wherein automatically selecting the audio clip comprises:
identifying, by the ML model, emotions conveyed by a plurality of stored audio clips; and
selecting, by the ML model, the audio clip from the plurality of stored audio clips in response to the ML model identifying the audio clip as conveying the emotion conveyed by the text of the text message from the user.

3. The method as recited in claim 1, wherein the connecting includes sending a link with the text message.

4. The method as recited in claim 1, wherein the selecting includes presenting multiple audio clips to the user that correspond to the text and the user selects the audio clip from the multiple audio clips.

5. The method as recited in claim 1, wherein the selecting includes automatically detecting a tone of the text message and selecting the audio clip based on the audio clip conveying the automatically detected tone.

6. The method as recited in claim 1, wherein the selecting includes detecting biometric data of the user and selecting the audio clip using the biometric data.

7. The method as recited in claim 1, further comprising playing the audio clip upon activation of the text message by the recipient.

8. The method as recited in claim 1, wherein the connecting includes embedding the audio clip with the text message.

9. The method as recited in claim 1, wherein automatically selecting the audio clip comprises the ML model selecting the audio clip based on a recognizability of the audio clip and a correspondence of the audio clip to the emotion conveyed by the text of the text message from the user.

10. A computing system, comprising:

an interface configured to receive a text message from a user; and one or more processors configured to perform operations including:

training a machine learning (ML) model to identify audio clips that convey corresponding emotions;

detecting, by the ML model, an emotion conveyed by text of the text message from the user;

automatically selecting, by the ML model, an audio clip that corresponds to the emotion conveyed by the text of the text message from the user, wherein automatically selecting the audio clip comprises:

identifying, by the ML model, a portion of an audio file that corresponds to the emotion conveyed by the text of the text message from the user; and automatically generating, by the ML model, the audio clip from the audio file in real-time after detecting the emotion conveyed by the text of the text message from the user such that the audio clip contains the identified portion of the audio file that corresponds to the emotion conveyed by the text of the text message from the user, wherein the audio file has a longer duration than the audio clip; and connecting the audio clip with the text message.

11. The system as recited in claim 10, wherein the connecting includes embedding the audio clip with the text message.

12. The system as recited in claim 10, wherein the connecting includes sending a link with the text message.

13. The system as recited in claim 10, wherein the selecting includes presenting multiple audio clips to the user that correspond to the text and the user selects the audio clip from the multiple audio clips.

14. The system as recited in claim 10, wherein the selecting includes automatically detecting a tone of the text message and selecting the audio clip based on the audio clip conveying the automatically detected tone.

15. The system as recited in claim 10, wherein the selecting includes detecting biometric data of the user and selecting the audio clip using the biometric data.

16. The system as recited in claim 10, wherein the operations further including delivering the text message and connected audio file to a recipient.

17. The system as recited in claim 10, wherein automatically selecting the audio clip comprises:

identifying, by the ML model, emotions conveyed by a plurality of stored audio clips; and selecting, by the ML model, the audio clip from the plurality of stored audio clips in response to the ML model identifying the audio clip as conveying the emotion conveyed by the text of the text message from the user.

18. A non-transitory computer-readable medium having a series of operating instructions stored thereon that direct one or more processors to perform operations when executed, the operations comprising:

training a machine learning (ML) model to identify audio clips that convey corresponding emotions;

detecting, by the ML model, an emotion conveyed by text of a text message from a user;

automatically selecting, by the ML model, an audio clip that corresponds to the emotion conveyed by the text of the text message from the user, wherein automatically selecting the audio clip comprises:

identifying, by the ML model, a portion of an audio file that corresponds to the emotion conveyed by the text of the text message from the user; and automatically generating, by the ML model, the audio clip from the audio file in real-time after detecting the emotion conveyed by the text of the text message from the user such that the audio clip contains the identified portion of the audio file that corresponds to the emotion conveyed by the text of the text message from the user, wherein the audio file has a longer duration than the audio clip;

connecting the audio clip with the text message; and delivering the text message to a recipient.

19. The computer-readable medium as recited in claim 18, wherein the connecting includes embedding the audio clip with the text message for the delivering to the recipient.

* * * * *